Oct. 7, 1947.    G. C. ARMSTRONG    2,428,539
ELECTRICALLY HEATED THERMORESPONSIVE SWITCH
Filed June 9, 1944
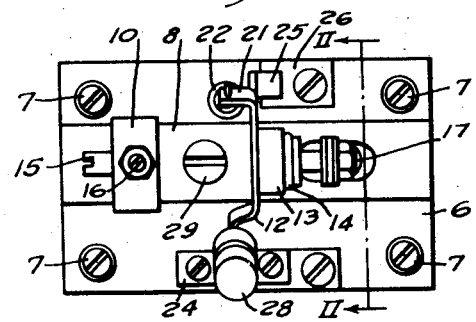
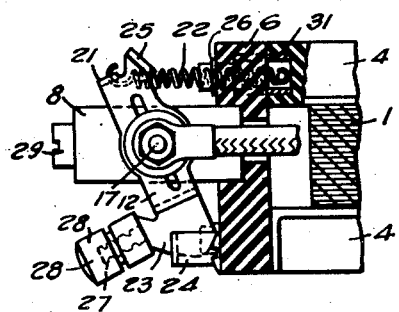
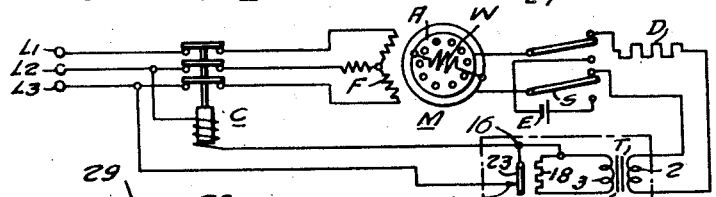
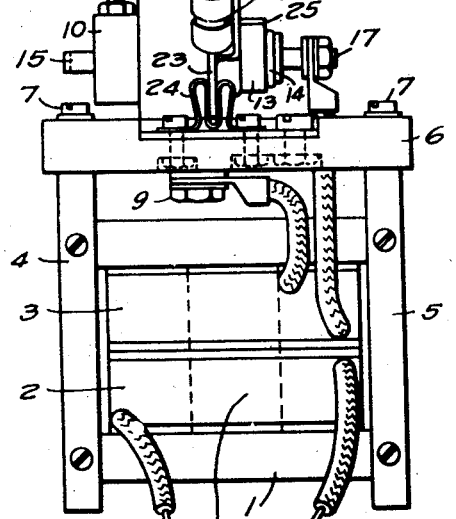
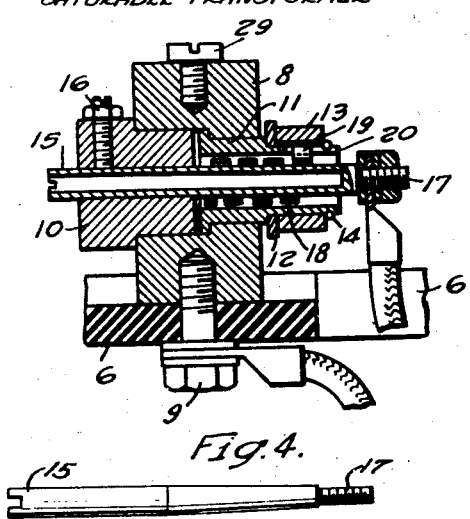
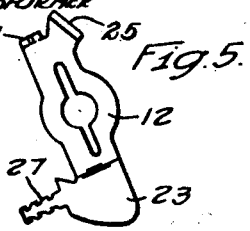
WITNESSES:
INVENTOR
George C. Armstrong.
BY
Paul E. Friedemann
ATTORNEY Patented Oct. 7, 1947

2,428,539

UNITED STATES PATENT OFFICE 2,428,539

ELECTRICALLY HEATED THERMORESPONSIVE SWITCH

George C. Armstrong, Forest Hills, Pa., assignor to Westinghouse Electric Corporation, East Pittsburgh, Pa., a corporation of Pennsylvania Application June 9, 1944, Serial No. 539,495

3 Claims. (Cl. 74—2)

My invention relates to electrically heated, thermoresponsive switches, such as overload relays, and in one of its aspects to relays for protecting alternating-current motors from overloads occurring during starting or accelerating periods.

It is an object of my invention to provide overload protective means whose time constant is capable of being adjusted to lower values than those usually obtainable in thermally controlled overload relays of the types now available.

Another object of my invention aims at providing a thermal relay for the protection of synchronous and wound rotor motors that changes its time constant or operating characteristic in dependence upon the frequency of the secondary motor current so that the relay affords reliable locked rotor protection while remaining inoperative when the motor accelerates from zero to synchronous speed under normal or permissible starting conditions.

The significance of these objects will be appreciated from a consideration of an example relating to the protection of the damper windings of synchronous motors during starting periods. In order to obtain such a protection, it is known to connect an overload relay in the field circuit of the motor, for instance, in series with the discharge resistor while the latter is connected across the rotor winding during the starting periods of the motor. When the motor accelerates from zero speed, a secondary current circulates in the field and relay circuit having at first the frequency of the line current. As the motor increases its speed, the frequency decreases until it becomes zero at synchronous speed. The relay, energized in response to the secondary current of changing frequency, must trip quickly if the motor fails to start, but not trip if the motor accelerates properly. In order to secure such a frequency-dependent operation, a saturable reactor has been connected in parallel to the thermal overload relay. Due to its changes in reactance in response to changes in frequency, this shunt reactor causes the relay to be more strongly energized at high frequency and to receive less energization at lower frequency. However, the application of such or similar means is unsatisfactory in many cases of application, because the available thermal overload relays have too long a time constant as compared with the time characteristic of the motor starting operation. It has also been difficult in such relay-reactor combinations to obtain a sufficient differential in time for affording a satisfactory locked motor protection together with a satisfactory safety margin which permits the motor to come to speed under normal or acceptable operating conditions. This shortcoming is due partly to the thermal inertia of the available relays, and partly to the RI drop in the saturable shunt reactor. The relays are designed to permit a relatively long starting period. In order to obtain, under these conditions, a trip time and shunt effect as required for danger protection, heater temperatures have to be put up with which may come dangerously near the burn out point. Therefore, the known thermal means for protecting damper windings of synchronous motors are in many cases rather difficult to adjust for safe locked rotor protection without unduly limiting the acceleration characteristic. Hence, in this field of application, the above-stated objects of the invention involve the aim to secure a safe locked rotor protection, while affording at the same time a sufficiently wide range of acceleration which permits starting the motor under different loads without causing the relay to trip unnecessarily under accelerating conditions not dangerous to the motor.

Another object of the invention is to devise a thermal relay of the latched-in type whose thermally controlled latching and releasing mechanism is of especially simple design and small size, but has nevertheless an accurate releasing operation and a safe latching operation even when exposed to vibration.

In order to achieve these objects, my invention provides a thermal relay in which a shaft member is traversed by electric current and consists of resistance material so as to be heated in accordance with the load conditions of the circuit attached thereto. This shaft member serves as a seat for a clutching spring winding which engages the shaft frictionally and thereby prevents a spring-biased contact-controlling member from moving under its bias. The clutching spring consists preferably of a helical bimetal strip and expands its turns radially when heated, thereby releasing its frictional grip on the shaft member.

These and other features of the invention will be more fully understood from the following description in conjunction with the appertaining drawing, in which:

Figure 1 shows a top view of a relay according to the invention, especially designed for protecting the damper windings of synchronous motors during starting periods;

Fig. 2 is a sectional side elevation of the upper portion of the same relay, the section being taken along a plane indicated in Fig. 1 by the dot and dash line marked II—II;

Fig. 3 is a front view of the complete relay according to Figs. 1 and 2;

Fig. 4 is an axial cross-section through the clutching and releasing device of the relay shown on a scale larger than that of the preceding figures;

Fig. 5 illustrates the movable contact member of the same relay;

Fig. 6 is a circuit diagram of a synchronous motor provided with a protective relay according to the invention; and Fig. 7 shows a shaft pertaining to the relay of Figs. 1 to 5, representing a slightly tapered portion of the shaft in an exaggerated manner for the purpose of explanation.

Referring to Figs. 1 through 5, numeral 1 denotes the magnetic structure of a transformer provided with a primary winding 2 and a secondary winding 3. A pair of supporting bars 4 and 5 is rigidly attached to the structure 1 at each side thereof. These supporting bars carry an insulating base 6 which is fastened thereto by means of screws 7. A supporting block 8 of highly conductive material is mounted on base 6 by means of a screw 9 which connects one terminal of the primary winding 3 to block 8. A metal block 10 is press-fitted into a bore of block 8, thereby securing a sleeve 11 in proper position. This sleeve 11 is rotatable relative to the block 8 and plug 10 and forms a hub for a movable contact member 12 with which it is firmly connected by means of a collar 13 and a snap-ring 14.

A shaft member 15 passes through the center bore of plug 10 and through sleeve 11 and is axially displaceable within plug 10. A screw 16 permits securing shaft 15 in a selected axial position relative to plug 10. The shaft member 15 consists of non-corrosive resistance material, such as nickel-chromium, and has an axial bore in order to assume the high electric resistance necessary for heating purposes. The end 17 of shaft 15 forms a binding post and is connected with the other terminal of the secondary winding 3. Hence, when in operation, the current induced in the secondary coil 3 passes from screw 9 through block 8, plug 10, and shaft 15 to the terminal 17. Thus, the shaft 15 forms a heater whose temperature depends on the secondary transformer current.

The shaft member 15 is slightly tapered from about its axial midpoint toward the binding post 17 as is apparent from the exaggerated showing of the tapering in Fig. 7. A helical bimetal strip 18 is seated on the tapered portion of the shaft member and has an end 19 in engagement with the axial slot 20 of sleeve 11. The other end of the bimetal strip 18 is free, but the diameter of the winding turns is so dimensioned that the winding grips the shaft 15 frictionally when cold, and hence prevents a rotation of the sleeve 11 relative to the block 8 in the winding-up or tightening direction of the bimetal winding. This frictional grip is loosened when the sleeve 11 is rotated in the opposite direction of the winding turns because such rotation will widen the turns and hence loosen the frictional engagement between the winding and the shaft.

The contact member 12 has a projection 21 which forms an eye for holding one end of a biasing spring 22 whose other end is fastened to a sleeve 31. This sleeve permits adjusting the tension of spring 22 by screwing it more or less into base 6, thereby displacing the position of the appertaining fastening point of the spring 22. The contact member 12 is further provided with a knife-type contact portion 23 which serves as a "break" contact and cooperates with a stationary contact 24 mounted on base 6. Contact 24 comprises a leaf spring and has a slight frictional grip on the movable contact when the latter is in the illustrated contact closing position. A lug 25 of contact member 12 serves as a "make" contact and cooperates with a stationary contact 26 of base 6. A threaded projection 27 of contact member 12 carries an actuating button 28. A screw 29 on top of block 8 forms a terminal for connecting the movable contact member 12 through the elements 11, 18 and 8 with one terminal of the circuit to be controlled by the relay, while the other terminals of this circuit are to be attached to the binding screws of stationary contacts 24 and 26.

When the movable contact member 12 is in the operative position illustrated in Figs. 1, 2 and 3, the "break" contact between elements 23 and 24 is closed, and the "make" contact between elements 25 and 26 is open. The biasing spring 22 tends to rotate contact member 12 clockwise, but such rotation is prevented by the frictional grip of the bimetal winding 18 on the relay shaft 15. When the secondary winding 3 of the transformer supplies sufficient current to heat the shaft member 15, the frictional grip of the bimetal winding is somewhat loosened and, in the case of an overload, the frictional clutch is released so that hub 11 and contact member 12 are free to rotate under the bias of spring 22. Due to the frictional grip of stationary contact 24 on the movable break portion 23 of contact member 12, the motion starts only after the frictional grip of the bimetal winding becomes less than the difference between the torque caused by spring 22 and the frictional torque caused by the contact 24. When the "break" contacts separate, the spring torque becomes definitely superior, so that the interruption of the "break" contacts occurs under snap action.

The relay can be set by pushing button 28 toward base 6 into the illustrated position, provided the bimetal winding has cooled sufficiently. Since this return motion tends to unwind the turns of the bimetal winding, the latter slides about shaft 15 until the circuit closing position of contacts 23 and 24 is reached. Upon release of button 28, the frictional clutch grip is again effective as described above.

Considering the relay mechanism as such, it will be seen from the foregoing description that the device is of especially simple design due to the fact that the member 15 forms not only the shaft of the relay but is also an immediate part of the releasable clutch as well as the current responsive heater for controlling the release operation. Due to the tapering design of the clutching portion of the shaft, the relay can be calibrated by fastening the shaft 15 in different axial positions relative to plug 10.

Due to the direct heating of shaft 15 by electric current to whose intensity the relay is to respond, a very accurate tripping operation is achieved, and it is possible to adjust the shaft member for an extremely low time constant of thermal releasing operation. The frictional grip between the shaft and the bimetal strip extends around the entire periphery of the shaft and over a multiplicity of turns and, hence, is strong enough to protect the relay from uncontrolled operation, for instance, when subjected to vibration.

Referring to Fig. 6, the function of the transformer relay unit in connection with a synchronous motor will now be explained by way of example. According to the schematic circuit diagram of Fig. 6, the stator windings F of a synchronous motor M are connected to line terminals L1, L2 and L3 through the contacts of a line contactor C. The armature A of motor M is provided with damper windings and has an auxiliary field winding W connected to slip rings whose corresponding brushes are connected to a switch S. During starting periods and after the closure of contactor C, the switch S connects the field winding W with a discharge resistor D, in series with the primary winding 2 of the transformer T, which forms part of a protective relay unit R designed in accordance with Figs. 1 through 5. When the armature has reached synchronous speed, the switch S is actuated and connects a direct-current source, here symbolized by a battery E, across winding W.

During the starting period, i. e. when the discharge resistor D and the transformer primary 2 are series-connected across the winding W, the current flowing in this secondary motor circuit has at first a high starting frequency which decays to zero as the armature comes up to full speed. Consequently, a current is induced in the secondary winding 3 of transformer T whose frequency is also high at the beginning of the accelerating period and declines gradually until the current vanishes at synchronous speed. Since the transformer core saturates rapidly as the frequency decreases, the current passing from the secondary transformer winding 3 through the heater 18 is not sufficient to trip the relay during the accelerating period. If the rotor is locked, the initial starting frequency of line frequency persists. In this case, the tripping time of the relay is extremely short by virtue of the direct heating of the shaft and clutch part 15 as explained previously.

As described in the foregoing, the proper time constant at starting frequencies can be adjusted readily by displacing the relay shaft 15.

The release of the relay clutch and the interruption of the break contacts 23 and 24 caused thereby have the effect of deenergizing the line contactor C, so that the motor is disconnected from the line terminals. The "make" contacts of the relay are not illustrated in Fig. 6. They may be used for auxiliary, for instance, signaling purposes.

It will be understood that while I have illustrated a relay especially designed and favorable for protecting alternating-current motors, by an operation depending upon the frequency of the current in a secondary motor circuit, it will be obvious that the thermal relay mechanism can also be used for other purposes with or without a transformer. It will also be obvious to those skilled in the art, upon studying the present disclosure, that various modifications can be made without departing from the essential features of my invention as defined in the claims appended hereto.

I claim as my invention:

1. A thermoresponsive device comprising a support, an elongated heating element mounted on said support so as to be axially displaceable relative to said support and having a conical portion, a thermoresponsive radially expansible clutching winding seated on said conical portion for frictionally gripping it when cold, said heating element and said winding alone constituting a clutching and unclutching device, a movable control member biased for motion in a given direction and connected with said winding to be normally prevented thereby from moving under its bias, and means connected to said heating element for passing current therethrough in order to release said winding at given current condition as calibrated by the position of said displaceable heating element relative to said support.

2. A thermoresponsive device comprising a support, a conical shaft member of conductive resistance material mounted on said support and being axially displaceable relative thereto, a radially expansible bimetal winding seated on said member for frictionally gripping it when cold, said shaft member and said winding alone constituting a clutching and unclutching device, a movable control member biased for motion in a given direction and connected with said winding to be normally prevented thereby from moving under its bias, and circuit means connected to said shaft member for passing current therethrough in order to release said winding at given current conditions.

3. A thermoresponsive device comprising, a support, a hollow and exteriorly conical shaft member mounted on said support and displaceable axially with respect thereto, a helical and radially thermo-expansible clutching spring seated on said conical member for frictionally gripping it when cold, said shaft member and said spring alone constituting a clutching and unclutching device, a device having a movable member rotatable about the axis of said shaft member and being biased for motion in a given direction and connected with said winding to be normally prevented thereby from moving under its bias, and circuit means connected to said shaft member for passing current therethrough in order to release said winding at given current conditions.

GEORGE C. ARMSTRONG.

REFERENCES CITED

The following references are of record in the file of this patent:

UNITED STATES PATENTS

| Number | Name | Date |
|---|---|---|
| 2,404,352 | Armstrong | July 23, 1946 |
| 1,877,976 | Rosenfeld et al. | Sept. 20, 1932 |
| 1,547,632 | Wensley | July 28, 1925 |
| 1,573,187 | O'Keefe | Feb. 16, 1926 |
| 1,874,076 | Wilcox | Aug. 30, 1932 |
| 2,252,444 | Stimson | Aug. 12, 1941 |
| 2,304,542 | Chambers | Dec. 8, 1942 |